(12) United States Patent
Goossens

(10) Patent No.: US 7,754,808 B2
(45) Date of Patent: Jul. 13, 2010

(54) FIRE-RESISTANT RUBBER COMPOSITION AND HOSE

(75) Inventor: Jan Goossens, Dendermonde (BE)

(73) Assignee: The Gates Corporation, Denver, CO (US)

( * ) Notice: Subject to any disclaimer, the term of this patent is extended or adjusted under 35 U.S.C. 154(b) by 519 days.

(21) Appl. No.: 11/259,474

(22) Filed: Oct. 26, 2005

(65) Prior Publication Data

US 2006/0100328 A1    May 11, 2006

Related U.S. Application Data

(60) Provisional application No. 60/622,322, filed on Oct. 26, 2004.

(51) Int. Cl.
  *C08L 31/04* (2006.01)
  *C08L 35/04* (2006.01)
  *C08K 5/55* (2006.01)
  *C08K 5/49* (2006.01)
  *F16L 11/04* (2006.01)

(52) U.S. Cl. .................. 524/563; 524/565; 524/566; 524/571; 524/404; 524/405; 524/436; 524/414; 524/415; 524/416; 524/417; 524/439; 524/437; 524/96; 524/100; 138/124; 138/126

(58) Field of Classification Search .............. 525/238, 525/224, 414, 404, 405, 251, 115, 183, 437, 525/186, 100, 415, 416, 439, 96, 563, 565
See application file for complete search history.

(56) References Cited

U.S. PATENT DOCUMENTS

| 2,878,219 | A | * | 3/1959 | Jenkins et. al. .............. 524/143 |
| 3,985,706 | A | | 10/1976 | Kay .......................... 260/45.75 |
| 4,193,945 | A | | 3/1980 | Bertelli et al. ................ 525/2 |
| 4,198,486 | A | * | 4/1980 | Mylich et al. ................ 521/79 |
| 4,488,577 | A | | 12/1984 | Shilad et al. ................ 138/127 |
| 4,533,687 | A | | 8/1985 | Itoh et al. ..................... 524/80 |
| 4,675,248 | A | * | 6/1987 | Buding et al. ............... 428/398 |

(Continued)

FOREIGN PATENT DOCUMENTS

EP    0 319 199 B1    11/1988

(Continued)

OTHER PUBLICATIONS

SU 485138 A (Aug. 26, 1976) abstract in English.*

(Continued)

*Primary Examiner*—David Wu
*Assistant Examiner*—Rip A. Lee
(74) *Attorney, Agent, or Firm*—P. N. Dunlap, Esq.; J. A. Thurnau, Esq.; J. L. Mahurin, Esq.

(57) ABSTRACT

A halogen-free, fire-resistant rubber composition comprising: 100 parts by weight of elastomer comprising 50-100 parts of at least one olefin-type elastomer; at least one fire-retardant boron source; at least one phosphorous source; at least 75 parts of at least one fire-retardant metal-hydrate; and at least one selected from the group consisting of a fire-retardant nitrogen compound and a nitrile-containing elastomer. The composition is suitable for use in fire-resistant, low-smoke hose. The hose may be used in fluid-handling systems requiring flame resistance and/or low smoke generation in fire.

32 Claims, 1 Drawing Sheet

U.S. PATENT DOCUMENTS

| | | | | |
|---|---|---|---|---|
| 4,731,406 A | | 3/1988 | Itoh et al. | 524/436 |
| 4,731,504 A | * | 3/1988 | Achille et al. | 174/107 |
| 4,769,179 A | * | 9/1988 | Kato et al. | 252/609 |
| 4,869,848 A | | 9/1989 | Hasegawa et al. | 252/609 |
| 4,918,127 A | | 4/1990 | Adur et al. | 524/415 |
| 5,218,027 A | * | 6/1993 | Smith et al. | 524/265 |
| 5,340,867 A | | 8/1994 | Yagawa et al. | 524/80 |
| 5,430,081 A | * | 7/1995 | Ohmae et al. | 524/100 |
| 5,604,024 A | * | 2/1997 | von Bonin | 442/6 |
| 6,025,423 A | * | 2/2000 | Breant | 524/412 |
| 6,207,735 B1 | * | 3/2001 | Kuma et al. | 524/100 |
| 6,338,015 B1 | * | 1/2002 | Kawagoe et al. | 701/41 |
| 6,797,200 B2 | * | 9/2004 | Scelza et al. | 252/601 |
| 6,846,536 B1 | * | 1/2005 | Priesnitz et al. | 428/36.91 |
| 2005/0059763 A1 | * | 3/2005 | Beck | 524/425 |

FOREIGN PATENT DOCUMENTS

| | | | |
|---|---|---|---|
| EP | 0 391 336 | | 10/1990 |
| EP | 0 531 788 A1 | | 8/1992 |
| JP | 61-152750 A | * | 7/1986 |
| JP | 08-198994 | | 8/1996 |
| JP | 10-195774 | | 7/1998 |
| WO | WO 03/48242 A1 | * | 6/2003 |
| WO | WO 03/048242 A1 | | 6/2003 |

OTHER PUBLICATIONS

DE 3338865 A1 (Aug. 16, 1984) abstract in English.*
JP 61-152750 A (Jul. 11, 1986) abstract in English.*
Paper No. 105, "HNBR/EVM Blends for Automotive Powertrain Applications", Rubber Division of AmericanChemical Society, Cleveland, OH, Oct. 14-17, 2003.
"Zinc Borate/ATH in Flexible PVC", Plastics Compounding, Ferm & Shen, Nov. 1994.
"Low Smoke, Non-Corrosive, Fire Retardent Cable Jackets Based on HNBR and EVM", H. Meisenheimer, Rubber World, (Jun. 1991), pp. 19-22, 47.
"Flammability", Encyclopedia of Polymer Science and Engineering, R.G. Gann et al, in H.F. Mark et al , vol. 7, pp. 154-210 (2nd edition 1987).
"Manual for the Rubber Industry", Kemmpermann et al, pp. 156-157, 136-137 (2nd ed., 1993).
"Manual for the Rubber Industry," Th. Kempermann et al., eds., 2d Ed., (1993) pp. 492-495, 552-555.
In re European Patent Application No. 05824748.7 (based on U.S. Appl. No. 11/259,474)—Applicant's Response to EPO dated Mar. 3, 2008, including final claims.
In re European Patent Application No. 05824748.7—EPO Notice of Intent to Grant, dated Apr. 18, 2008.

* cited by examiner

FIRE-RESISTANT RUBBER COMPOSITION AND HOSE

REFERENCE TO RELATED APPLICATIONS

This application claims priority from U.S. provisional patent application Ser. No. 60/622,322 filed Oct. 26, 2004.

BACKGROUND OF THE INVENTION

This invention relates to a fire-resistant rubber composition. This invention also relates to a fire-resistant hose comprising the fire-resistant rubber composition.

Rubber hose is in wide use for material transfer and fluid power applications. Fire resistance standards for hose used in transportation vehicles have become increasingly stringent. The most stringent standards apply to hose used on railway passenger trains, in particular trains that travel substantially through tunnels. Examples of such standards include British Standard BS 6853:1999 [class Ia], Norme Français or French Standard NF F 16-101 [category A1], and German Standard DIN 5510-2. Some of the requirements of these fire resistance standards are that the materials generate very low smoke density during burning, be self-extinguishing when on fire, have very high limiting oxygen index (LOI), have very high flammability temperature, only emit gasses with very low toxicity, be halogen-free and heavy-metal free, and be electrically isolating. At the same time, the hose must comply with the various conventional design requirements, such as listed in relevant railway standards including UIC 830-1 and the like. Hose performance includes such factors as burst pressure, cold flexibility, oil resistance, hot air resistance, ozone resistance, and structural integrity of various adhered layers. It is generally recognized in the art that the more fire retarding additives one mixes into the rubber in an attempt to meet fire standards, the worse the physical properties become.

Much prior art is directed to improving the fire resistance of wire and cable insulation. It is known that halogen-containing fire retardants and halogenated polymers are corrosive and generate much smoke and toxic fumes. Therefore recent prior art is directed to halogen-free compositions. For example, U.S. Pat. No. 4,675,248 discloses a blend of ethylene-vinylacetate (EVM) and hydrogenated nitrile-butadiene rubber (HNBR) with a synergistic fire-retarding combination of aluminum trihydrate (ATH) and zinc borate (ZB). In a related publication by Herman Meisenheimer, "Low smoke, non-corrosive, fire retardant cable jackets based on HNBR and EVM, Rubber World, 19 (June 1991), it is disclosed that very high values of LOI can be obtained at very high loadings of ATH, but that tear strength specifications are not met by the resulting compositions. Hose physical property requirements are different, generally more demanding, than wire and cable requirements.

U.S. Pat. No. 5,340,867 discloses a flame-retardant rubber composition based on red phosphorous and a nitrile-group containing elastomer, but the LOI is only about 27.5%. U.S. Pat. No. 4,533,687 discloses a fire-retarding synergistic blend of ATH and red phosphorous in combination with organopolysiloxane for improving the fire-resistance of olefin-type elastomers, but the highest LOI reported is is only 30%. What is needed for a hose to comply with NF F 16-101 is an LOI greater than 34%.

Various textbooks and handbooks discuss the wide array of fire retardants available for a wide array of plastic and elastomer applications. See e.g. R. G. Gann et al., "Flammability," in H. F. Mark et al., eds., Encyclopedia of Polymer Science and Engineering, v. 7, pp. 154-210, (2d ed. 1987). However, it is clear that combinations are rarely synergistic. Sometimes, combining ingredients leads only to minor additive effects or even antagonistic effects. Known rubber compositions and hoses fall short of current and future needs. What is needed is a rubber composition with improved fire resistance and sufficient physical performance properties to meet the stringent hose performance standards discussed above.

BRIEF SUMMARY OF THE INVENTION

The invention is directed to a rubber composition with improved fire resistance and to a hose comprising the rubber composition. In one embodiment of the invention the rubber composition comprises: 100 parts by weight of elastomer comprising 50-100 parts of at least one olefin-type elastomer; at least one fire-retardant boron source; at least one phosphorous source; at least 75 parts of at least one fire-retardant metal-hydrate; and at least one selected from the group consisting of a fire-retardant nitrogen compound and a nitrile-containing elastomer.

In another embodiment of the invention the rubber composition comprises: 100 parts by weight of an elastomer base comprising a blend of a halogen-free olefin-type elastomer and from about 10 to less than 50 parts of a halogen-free nitrile-containing elastomer; 10-20 parts of a boron source; 2-34 parts of a phosphorous source; 75-195 parts of a metal hydrate; and up to 16 parts of a fire-retarding nitrogen compound.

In another embodiment the rubber composition comprises: 100 parts by weight of an elastomer base comprising a blend of EVM and less than 50 parts HNBR; 10 to 20 parts of zinc borate; 2 to 8 parts of red phosphorous; 75 to 195 parts of aluminum trihydrate; 14 to 26 parts of trioctylphosphate; and up to 16 parts of melamine phosphate. The rubber composition may optionally comprise conventional rubber chemicals such as antioxidants, processing aids, antiozonants, curatives, coagents, and fillers. The properties of the composition may thus be adjusted to meet specific physical characteristics such as modulus, tensile strength, abrasion resistance, low temperature flexibility, and the like. The rubber composition should also not comprise toxic smoke-generating fire-retardant ingredients, such as halogen-containing fire retardants, antimony compounds, more than 20 parts carbon black, or the like.

The hose articles of the invention encompass various types of reinforced hose generally of a flexible nature including, by way of illustration, railroad air-brake hose, sand-brake hose and coolant hose, automotive radiator and heater hose, hydraulic hose, protective sleeve for cable, and the like. The invention is not limited to any specific type of hose. The hose may comprise a cover utilizing the fire-resistant composition, a tube utilizing the composition, or both. The tube and cover may comprise distinct embodiments of the composition.

In another embodiment the invention is a fluid handling system comprising a fire-retardant hose as described above, a pump, and a connector.

DETAILED DESCRIPTION OF THE INVENTION

Figure 1:
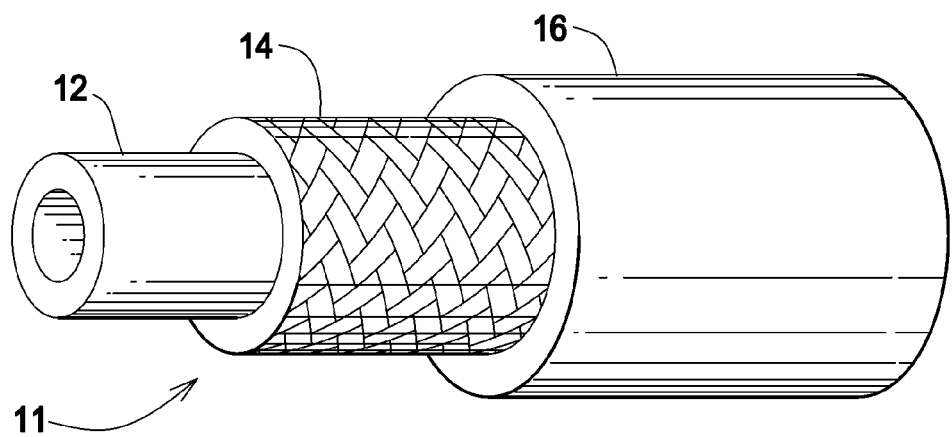
FIG. 1 is a perspective view, with parts in section, of a hose constructed in accordance with the present invention.

Referring to FIG. 1, a typical hose is illustrated, constructed according to one embodiment of the present invention. The hose 11 comprises an elastomeric inner tube 12, a reinforcement member 14 telescoped over and preferably adhered to the inner tube 12, and an elastomeric outer cover 16 telescoped over and preferably adhered to the reinforcement member 14. The reinforcement member 14 is formed of a suitable reinforcement material which may include organic or inorganic fibers or brass-plated steel wires. Useful organic fiber reinforcement materials include nylon, polyester, aramid, cotton and rayon. The reinforcement construction may be of any suitable type such as braid, spiral, knit or wrapped, but in the embodiment shown, is of a braid construction. The reinforcement member 14 may comprise one or more layers of fiber reinforcement and one or more fiber reinforcement materials.

The inner tube 12 may consist of multiple elastomeric or plastic layers which may or may not be of the same composition. The elastomeric outer cover 16 is made of suitable materials designed to withstand the exterior environment encountered. The inner tube 12 and the outer cover 16 may be made of the same material. The hose 11 may be formed by any conventional methods including molding and extrusion. At least one elastomeric layer of either the inner tube 12 or outer cover 16 may be made more fire resistant according to the present invention, thus improving the fire resistance of the hose.

The details of the hose construction are not critical, as long as the materials used provide sufficient fire-resistance and performance characteristics for the respective application. In one embodiment of the invention, the hose comprises at least one layer of rubber of the inventive composition. In another embodiment of the invention, substantially all of the rubber in the hose is of the inventive composition. The inventive composition may be adjusted using known rubber compounding techniques to achieve different properties for various layers. For example, in another embodiment of the invention, the inner tube layer 12 has a lower loading of fillers for higher dynamic performance, while the outer cover layer 16 has a higher filler loading to give higher abrasion resistance and toughness.

The rubber composition of the present invention comprises a halogen-free elastomeric blend mixed with several fire-retardant ingredients and various optional ingredients. Though each individual component is known in the art, the combination is new. Though the effects of each component are generally known for some polymer systems in the art, the effects of combining these ingredients and/or using them in different polymer systems are unpredictable. It is generally unknown whether the effects of individual ingredients will be additive, synergistic or antagonistic when combined. What is generally known is that increased amounts of any particular fire retardant ingredient or combination, while increasing the fire resistance of the compound, will degrade the physical properties and/or the processing characteristics of the resulting composition. Thus, the improvements sought are very difficult to achieve. The halogen-free elastomer is selected from the group of olefin-based polymers, and acrylate polymers ("ACM" according to ASTM D1418 nomenclature for rubber), and includes olefin-based copolymers such as ethylene-acrylic copolymers (AEM) and ethylene-vinylacetate (EVM) copolymers. Olefin-based polymers include ethylene-alpha-olefins such as ethylene-propylene, ethylene-butene, and ethylene-octene and ethylene-alpha-olefin-diene terpolymers. These elastomers are generally quite flammable, but generate low smoke. They require significant compounding effort to achieve the physical properties required for hose. EVM is preferred because of its compatibility with nitrile-containing elastomers. The EVM may have a vinylacetate content in the range from 35% to 75%. One embodiment of the invention comprises EVM having a vinylacetate content of about 50%.

A second halogen-free elastomer is a nitrile-containing elastomer and is preferably selected from the group consisting of nitrile-butadiene rubber (NBR), hydrogenated nitrile-butadiene (HNBR), and nitrile-butadiene terpolymers in which a third monomer, such as styrene, one of various acrylates or the like, is typically included to adjust glass transition temperature, for example to improve low or high temperature properties. The nitrile-containing co- and terpolymers may be hydrogenated or carboxylated or both. One embodiment of the invention comprises HNBR because of its high strength and heat resistance and compatibility with EVM. The HNBR may have a nitrile content in the range from 17% to 50% and a residual unsaturation level in the range from 0% to 15%. One embodiment of the invention comprises HNBR having a nitrile content of about 34% and unsaturation of about 4%. The nitrile-containing elastomer is also believed to function as a fire-retardant source of nitrogen or promote char formation.

The metal hydrate is preferably one or more selected from the group aluminum trihydrate (ATH), magnesium hydroxide, calcium hydroxide, magnesium carbonate and the like. Metal hydrate is selected as a filler because of its cost effectiveness and the large amount of water released at high temperatures, which dilutes the oxygen supply in the atmosphere surrounding the hose. The metal hydrate may optionally be surface treated with stearic acid, silane, or the like for improved dispersion or reinforcement. One embodiment of the invention comprises ATH sold under the trademark of Apyral 60D by Nabaltec with a particle size of 4.5 μm and a surface area of 6.5 $m^2/g$. The amount of metal hydrate may be in the range of from 75 parts to 195 parts based on 100 parts of elastomer. Below 75 parts, there will not be sufficient fire-retarding effect. Above 195 parts, the processability and physical properties of the compound will degrade. In particular, excessively high levels of metal hydrate lead to excessively high-viscosity compounds that cannot be mixed and/or extruded properly.

The boron source is preferably selected from the group consisting of boric acid, sodium borate, and zinc borate. One embodiment of the invention comprises zinc borate sold under the trademark Firebrake ZB by Luzenac. Zinc borate is believed to react synergistically with ATH to produce a fire-resistant, smoke-suppressing char. The amount of boron source may be in the range from about 10 parts to about 20 parts based on 100 parts of elastomer, which is the optimum range for the synergistic effect with ATH.

A nitrogen compound is preferably selected from the group consisting of melamine, melamine cyanurate, ammonium phosphates and melamine phosphates. It is chosen for its ability to act as a heat sink, inert gas-phase diluent, poor fuel, and because it produces a porous, insulating char. The foaming/char-forming effect is known as intumescence. The choice of nitrogen compound is generally based on compatibility with the elastomer blend. A suitably chosen nitrogen compound can improve the rubber physical properties while permitting a reduction in the amount of metal hydrate, thus improving processability and performance without sacrificing fire-resistance. A preferred amount of nitrogen compound is the range from about 4 parts to about 16 parts based on 100 parts of elastomer. Below 4 parts, the fire retarding effect will not be sufficient, and much more of the metal hydrate will be required resulting in poor physical properties and high viscosity. One embodiment of the invention comprises melamine phosphate (sold for example under the trademark Melagarp MP by Italmatch, or Melapur MP by Ciba Specialties) as the nitrogen compound.

The phosphorous source is preferably from the group ammonium polyphosphate, red phosphorous, and phosphate esters. One embodiment of the invention comprises red phosphorous because of its well known fire-retarding, char-forming synergy with ATH. Red phosphorous is also believed to improve the fire resistance of nitrile-containing elastomers. The red phosphorous may be predispersed or bound in polymeric resin for ease in handling. For example, red phosphorous bound in ethylene-vinylacetate (EVA) may be used. The amount of red phosphorous (sold under the trademark Masteret 40470 by Italmatch) should be in the range from about 2 to about 8 parts per 100 parts elastomer for optimum fire retarding synergy with the ATH.

Another embodiment of the invention comprises a combination of red phosphorous and phosphorous-containing plasticizer such as trioctylphosphate as the phosphorous. The amount of phosphorous source may thus be increased to as much as 34 parts per 100 parts of elastomer.

The phosphorous-containing plasticizer is believed to serve the dual role of promoting char forming and providing a way to adjust the modulus or flexibility of the composition. The plasticizer may preferably be a phosphate ester such as trioctylphosphate (TOF), triphenylphosphate, tricresylphosphate and the like. One embodiment of the invention comprises TOF (exemplified by Disflamoll TOF, sold under that trademark by Lanxess), which is particularly useful for improving the cold flexibility of the rubber. The amount of plasticizer is not critical but is chosen to give the desired physical properties. Typically the amount of plasticizer will be in range from about 10 to about 26 parts, but is not limited to that range.

An inorganic silica source is believed to be helpful for char-forming. However, silica is primarily used as the reinforcing filler, giving control over the modulus and increasing the tensile strength of the rubber composition. Silica is inert to fire, so it does not contribute to smoke as carbon black does. Suitable silica sources include clays, talcs, fumed or precipitated silicas or silicates (for example various grades sold under the trademark Vulkasil by Bayer or Ultrasil by Degussa), and siliceous earth (for example that sold under the trademark Sillitin N82 by Hoffmann Minerals), and these may optionally be silane treated. The amount of silica is not critical, but may be chosen to give the desired physical properties.

A small amount of carbon black, less than about 20 parts per hundred parts elastomer, may be used to provide coloring. The large amounts of carbon black typically used in rubber compounding should be avoided because of carbon black's contribution to smoke. In one embodiment of the invention, less than about 10 parts of carbon black may be used. In another embodiment of the invention, no more than about 5 parts of carbon black may be used. Likewise, conventional plasticizers should be avoided because they would impart increased flammability and smoke.

Curatives are required in the composition to produce required physical properties. Peroxide curatives or vulcanization by ionizing radiation are preferred because both HNBR and EVM can be cured with free radicals. Free radical curing does not introduce any toxic fumes or heavy metals as some types of conventional sulfur-based accelerators would. Nevertheless, sulfur cure systems can be used if carefully chosen to avoid these problems.

Further optional components may be used as known to those skilled in the art. These include but are not limited to antioxidants, antiozonants, process aids, coagents, reinforcing fibers, inert fillers, coupling agents, vulcanizing agents, adhesion promoters, pigments, plasticizers, and the like. As mentioned above, ingredients containing heavy metals, halogens, or otherwise likely to contribute to toxic fumes or smoke should be avoided or kept to a minimum.

The hose or hose assembly of the present invention may also comprise a coupling, fitting or connector which is provided at either end of the hose to facilitate connection of the hose to other components of a complete fluid handling system. Other components of a fluid handling system include for example, one or more additional devices known in the art such as a pump, a valve, a vent, a manifold, a fitting, tubing, a gauge, a filter, a regulator, a fluid reservoir, an accumulator, and an operational device or active component. An active component may be for example an actuator, a brake, a motor, a cylinder, a robotic device, and the like. A pump may be for example a centrifugal pump, a diaphragm pump, a rotary pump, a blower, a compressor, a piston pump, a gear pump, a vane pump, or the like.

Figure 2:
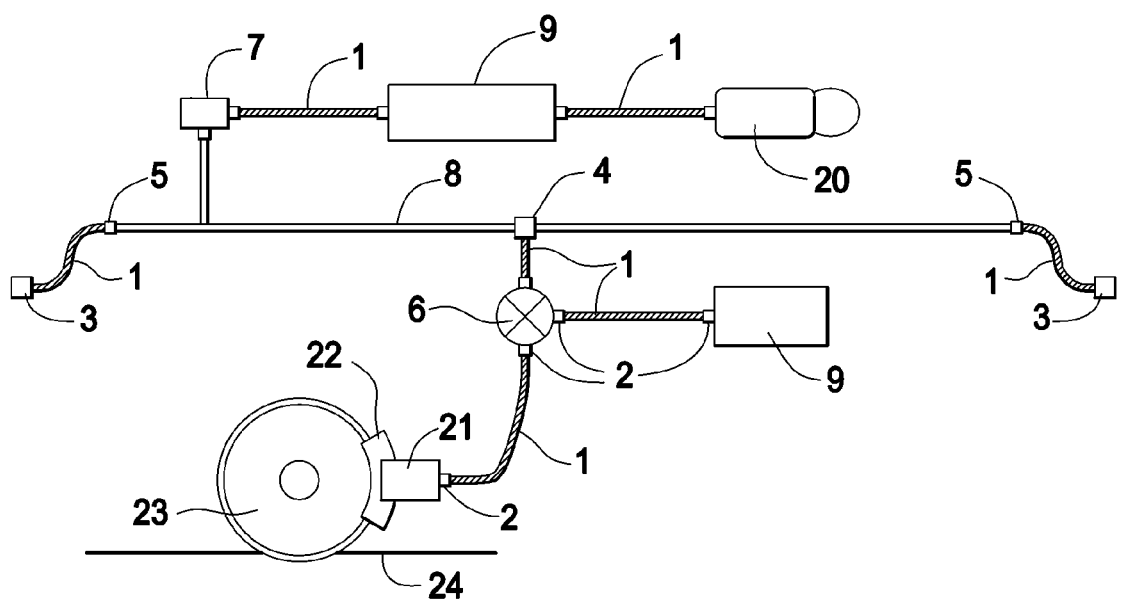
FIG. 2 is a schematic representation of a fluid-handling system comprising a hose constructed in accordance with the present invention.

An example of a fluid handling system is shown in the schematic diagram of FIG. 2. FIG. 2 represents a railroad air-brake system. The system comprises various lengths of the inventive hose 1, various connecting fittings 2, 3, 4, and 5, various valves 6, and 7, reservoirs 9, pipe or tubing 8, compressor 20, and brake cylinder 21. The compressor 20 may comprise a pump and a motor and supplies compressed air to the reservoirs 9. Control valve 7, in conjunction with triple valve 6 is used to control the cylinder 21 to activate or release the brake block 22 which contacts the wheel 23 on the rail 24. The coupling 3 attached to hose 1 provides means of interconnecting multiple rail cars. Fitting 5 may be an angle cock and fitting 4 may be a T.

The following examples are submitted for the purpose of illustrating the nature of the invention and are not intended as a limitation on the scope thereof.

EXAMPLES

Two rubber compositions according to the proportions indicated in Table 1 were prepared by combining all ingredients in an internal mixer and blending using techniques well known in the art. Example 1 is suitable for a rubber tube and has less filler and is more polymer rich than Example 2. Example 2 is suitable for a cover compound. The resulting rubber compounds were formed into a ¼-inch hose for Example 3 and a 1-inch hose for Example 4 by sequential extrusion onto a mandrel. The tube compound was extruded first, followed by application of a polyester yarn braided reinforcement layer thereon, and finally the cover was extruded over the yarn layer. The uncured hose was wrapped with nylon fabric, vulcanized, unwrapped and removed from the mandrel. The compositions of the two examples are shown in Table 1.

The two compositions of Examples 1 and 2 met the target for LOI as shown in Table 1. The physical properties of the two compositions were sufficient to ensure that the hose met the burst pressure target for railway brake hose as shown in Table 1. The flame resistance and smoke generation of the hose was sufficient to meet the target as shown in Table 1.

TABLE 1

| Ingredients (parts by weight) | Ex. 1 (Tube) | Ex. 2 (Cover) | Ex. 3 (¼" Hose) | Ex. 4 (1" Hose) |
|---|---|---|---|---|
| EVM - 50% Vinyl Acetate | 65 | 65 | | |
| HNBR - 34% Nitrile | 35 | 35 | | |
| Silica | 72 | 50 | | |
| Siliceous Earth | 0 | 16 | | |
| ATH | 114 | 152 | | |
| TOF | 20 | 20 | | |
| Red Phosphorous | 5 | 5 | | |
| Melamine Phosphate | 10 | 10 | | |
| Zinc Borate | 15 | 15 | | |
| Other Chemicals[1] | 46 | 46 | | |
| Tensile Strength (MPa) | 7.5 | 7.0 | | |
| LOI (Target >34%) | 38% | 40% | | |
| Toxicity (Target <1.0) | 0.46 | 0.38 | | |
| Smoke Gas Index (Target F1, <20) | | | F1 (19.3) | F1 (17.0) |
| Burst Pressure (Target >70 Bar) | | | 155 | 85 |

[1] Includes a peroxide curative, an antioxidant, coagents, and adhesion promoters.

LOI testing was carried out in accordance with the procedure of ASTM D-2863 (ISO 4589). Toxicity testing was carried out in a closed oven in non-flaming mode in accordance with the procedure of BS 6853:1999 Annex B (NF X 70-100). Toxicity has no units of measure, being a weighted summation of dimensionless test results. Smoke testing was carried out by burning a piece or pieces of hose in accordance with the procedure of NF X 10-702. The smoke density result per NF X 10-702 and the toxicity result per NF X 70-100 were combined to obtain a Smoke Gas Index in accordance with the procedure of NF F 16-101. Rubber test specimens were tested for tensile strength using well-known rubber test methods. Burst strength of the hose was tested in accordance with the procedure of EN ISO 1402 (SAE J343). Smoke testing was also carried out by burning a 1-meter bundle of hose, vertically in a closed chamber with an alcohol flame and measuring the optical density in accordance with the procedure of BS 6853:1999 Annex D. Thought the hose of Ex 3 and 4 did not pass this extremely stringent smoke test, it is believed that rubber and hose according to a different embodiment of this invention is capable of meeting this more stringent smoke standard. The composition and hose of this invention are also believed to meet future fire resistance standards such as prEN 45545-2, which is expected to eventually replace current European local standards such as BS 6853 and NF F 16-101.

Thus, the present invention provides a fire-resistant rubber composition and hose incorporating the same which combines the desired physical performance properties of hose with high LOI and low smoke and low toxic fume generation when subjected to fire. The composition may also be useful in wire and cable applications, power transmission belts, and molded rubber goods whenever extreme fire resistance is needed.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A halogen-free, fire-resistant rubber composition comprising:
    100 parts by weight of elastomer comprising 50-90 parts of at least one olefin-type elastomer and 10 to 50 parts of a nitrile-containing elastomer;
    at least one fire-retardant boron source;
    red phosphorous and at least one other fire-retardant phosphorous source;
    at least 75 parts of at least one fire-retardant metal-hydrate; and
    at least one fire-retardant melamine or ammonium compound selected from the group consisting of melamine, melamine cyanurate, ammonium phosphates, melamine phosphates, and ammonium polyphosphate.

2. A halogen-free, fire-resistant rubber composition comprising:
    100 parts by weight of elastomer comprising 50-100 parts of at least one olefin-type elastomer;
    at least one fire-retardant boron source selected from the group consisting of boric acid, sodium borate, and zinc borate;
    red phosphorous and at least one other fire-retardant phosphorous source;
    at least 75 parts of at least one fire-retardant metal-hydrate;
    at least one nitrogen source selected from the group consisting of a fire-retardant nitrogen compound and a nitrile-containing elastomer;
    an inorganic silica source and less than 20 parts of carbon black.

3. A halogen-free, fire-resistant rubber composition comprising:
    100 parts by weight of elastomer comprising 50-90 parts of at least one olefin-type elastomer;
    10-20 parts of at least one fire-retarding boron source selected from the group consisting of boric acid, sodium borate, and zinc borate;
    2-34 parts total of red phosphorous and at least one other fire-retardant phosphorous source;
    75-195 parts of at least one metal-hydrate;
    10-66 parts of at least one nitrogen source selected from the group consisting of a fire-retardant nitrogen compound and a nitrile-containing elastomer;
    an inorganic silica source and less than 20 parts of carbon black.

4. A halogen-free, fire-resistant rubber composition comprising:
    100 parts by weight of an elastomer blend comprising 90 to 50 parts of an olefin-type elastomer and 10 to 50 parts of a nitrile-containing elastomer;
    10-20 parts of a boron source;
    2-34 parts total of red phosphorous and at least one other fire-retardant phosphorous source;
    75-195 parts of a metal hydrate; and
    4-16 parts of a fire-retarding melamine or ammonium compound selected from the group consisting of melamine, melamine cyanurate, ammonium phosphates, melamine phosphates, and ammonium polyphosphate.

5. The composition of claim 4 further comprising an inorganic silica source and less than 20 parts of carbon black.

6. The composition of claim 5 wherein the olefin-type elastomer is selected from the group consisting of ethylene-alpha-olefin elastomers, ethylene-propylene elastomers, ethylene-acrylic elastomers, ethylene-vinylacetate elastomers, and acrylate elastomers.

7. The composition of claim 5 wherein the olefin-type elastomer is ethylene-vinylacetate having a vinylacetate content in the range of 35% to 75%.

8. The composition of claim 6 wherein the nitrile-containing elastomer is selected from the group consisting of nitrile-butadiene copolymers and terpolymers and carboxylated and hydrogenated versions thereof.

9. The composition of claim 6 wherein the nitrile-containing elastomer is hydrogenated nitrile-butadiene rubber having a nitrile content in the range from 17% to 50%, and having a residual unsaturation level up to 15%.

10. The composition of claim 8 wherein the boron source is selected from the group consisting of boric acid, sodium borate and zinc borate.

11. The composition of claim 8 wherein the boron source is zinc borate.

12. The composition of claim 10 wherein the metal hydrate is selected from the group consisting of aluminum trihydrate, magnesium hydroxide, magnesium carbonate, calcium hydroxide, and combinations thereof.

13. The composition of claim 10 wherein the metal hydrate is aluminum trihydrate.

14. The composition of claim 12 wherein the other phosphorous source is selected from the group consisting of, ammonium phosphates, phosphate esters, and combinations thereof.

15. The composition of claim 12 comprising 2-8 parts of said red phosphorous and wherein the other phosphorous source comprises as much as about 26 parts of a phosphorous-containing plasticizer.

16. The composition of claim 15 wherein the phosphorous-containing plasticizer is selected from the group consisting of phosphate esters, tricresylphosphate, trioctylphosphate, and triphenylphosphate.

17. The composition of claim 15 wherein the phosphorous-containing plasticizer is trioctylphosphate.

18. The composition of claim 14 wherein the fire-retarding melamine or ammonium compound is selected from the group consisting of melamine, melamine cyanurate, ammonium phosphates, and melamine phosphates.

19. The composition of claim 14 wherein the fire-retarding melamine or ammonium compound is melamine phosphate.

20. The composition of claim 18 wherein the silica source is selected from the group consisting of silica, silicate, siliceous earth, precipitated silica, precipitated silicates, fumed silica, talc, clay, and silane-treated varieties thereof and combinations thereof.

21. The composition of claim 18 comprising no more than 5 parts of carbon black.

22. A fire-resistant hose comprising a halogen-free, fire-resistant rubber composition comprising:
   100 parts by weight of an elastomer blend comprising 90 to 50 parts of an ethylene-vinylacetate elastomer and 10 to 50 parts of a hydrogenated nitrile-butadiene elastomer;
   10-20 parts of zinc borate;
   2-8 parts of red phosphorous;
   75-195 parts of a aluminum trihydrate;
   10-26 parts of trioctylphosphate;
   4-16 parts of melamine phosphate;
   and an inorganic silica source.

23. A fire-resistant hose comprising an inner tube layer and an outer cover layer, wherein at least one of said tube and said cover comprise a halogen-free, fire-resistant rubber composition comprising:
   100 parts by weight of an elastomer blend comprising 90 to 50 parts of an olefin-type elastomer and 10 to 50 parts of a nitrile-containing elastomer;
   10-20 parts of a boron source;
   2-34 parts total of red phosphorous and at least one other fire-retardant phosphorous source;
   75-195 parts of a metal hydrate; and
   4-16 parts of a fire-retarding melamine or ammonium compound selected from the group consisting of melamine, melamine cyanurate, ammonium phosphates, melamine phosphates, and ammonium polyphosphate.

24. The hose of claim 23 wherein both said tube and cover comprise an embodiment of said fire-resistant rubber composition.

25. The hose of claim 24 wherein said melamine or ammonium compound is one or more selected from the group consisting of melamine, melamine cyanurate, ammonium phosphates, and melamine phosphates.

26. The hose of claim 25 wherein said rubber composition comprises:
   2-8 parts of said red phosphorous; and
   wherein said at least one other fire-retardant phosphorous source comprises 10-26 parts of one or more phosphorous-containing plasticizers selected from the group consisting of phosphate esters, tricresylphosphate, trioctylphosphate, and triphenylphosphate.

27. The hose of claim 26 wherein said boron source is one or more selected from the group consisting of boric acid, sodium borate and zinc borate.

28. The hose of claim 27 wherein said metal hydrate is selected from the group consisting of aluminum trihydrate, magnesium hydroxide, calcium hydroxide, and combinations thereof.

29. The hose of claim 27 wherein said rubber composition further comprises an inorganic silica source and less than 5 parts of carbon black.

30. A fluid handling system comprising a pump, a hose connector, and a fire-resistant hose comprising an inner tube layer and an outer cover layer, wherein at least one of said tube and said cover comprise a halogen-free, fire-resistant rubber composition comprising:
   100 parts by weight of an elastomer blend comprising 90 to 50 parts of an olefin-type elastomer and 10 to 50 parts of a nitrile-containing elastomer;
   10-20 parts of a boron source;
   2-34 parts total of red phosphorous and at least one other fire-retardant phosphorous source;
   75-195 parts of a metal hydrate; and
   4-16 parts of a fire-retarding melamine or ammonium compound selected from the group consisting of melamine, melamine cyanurate, ammonium phosphates, melamine phosphates, and ammonium polyphosphate.

31. The system of claim 30 wherein both said tube and cover comprise an embodiment of said fire-resistant rubber composition;
   and said melamine or ammonium compound is on elected from the group consisting of melamine, melamine cyanurate, ammonium phosphates, and melamine phosphates;
   and said rubber composition comprises:
   2-8 parts of said red phosphorous; and
   wherein said at least one other fire-retardant phosphorous source comprises 10-26 parts of one or more phosphorous-containing plasticizers selected from the group consisting of phosphate esters, tricresylphosphate, trioctylphosphate, and triphenylphosphate.

32. The system of claim 31 wherein said rubber composition further comprises an inorganic silica source and less than 5 parts of carbon black.

* * * * *